United States Patent [19]

Terrell et al.

[11] Patent Number: 4,867,192

[45] Date of Patent: Sep. 19, 1989

[54] APPARATUS FOR CONTROLLING IRRIGATION WATER PH FOR GOLF COURSES

[76] Inventors: B. Joe Terrell, 207 W. South, Weimar, Tex. 78962; Steven J. Terrell, Box 353, Simonton, Tex. 77476

[21] Appl. No.: 305,540

[22] Filed: Feb. 3, 1989

[51] Int. Cl.$^4$ ............................................. A01G 25/00
[52] U.S. Cl. ........................................ 137/93; 239/69; 137/624.11
[58] Field of Search ........... 137/5, 93, 624.11, 624.12; 239/10, 310, 69

[56] References Cited

U.S. PATENT DOCUMENTS

| | | | |
|---|---|---|---|
| 3,760,829 | 9/1973 | Schick | 137/93 |
| 4,016,079 | 4/1977 | Severin | 137/93 |
| 4,768,712 | 9/1988 | Terrell | 137/624.12 |

Primary Examiner—Alan Cohan

[57] ABSTRACT

An automatically controlled irrigation water pH amendment system and apparatus associated with golf courses utilizing automatic irrigation systems to irrigate the various species of turf grasses used on fairways, tees, greens and other areas; being adapted to receive an operator pre-selected program of desired irrigation water pH value; to monitor the delivered pH value of the irrigation water and automatically blend into the irrigation water in the flow circuit between the discharge of the irrigation pump station pumps and the pH monitoring point the proper amount of chemical additive to amend—raise or lower—the pH of the delivered irrigation water. The desideratum is a uniformly blended mixture of liquid acid or base chemical with irrigation water to maintain a solution of the water pH value desired by the operator to promote proper agronomic practice in the maintenance of the turf grasses. This objective has been found to be obtainable by causing the two liquids to be blended in the proper ratios through the use of an acid tank, pH sensing probe, sulfuric acid injector pumps, acid manifold, booster pump, flow velocity measuring device, and a solid-state electrical programmable controller; connected to the upstream and downstream ports of an ordinary pressure sustaining valve or differential pressure orifice device as used in the discharge line of a golf course pumping station.

11 Claims, 1 Drawing Sheet

APPARATUS FOR CONTROLLING IRRIGATION WATER PH FOR GOLF COURSES

BACKGROUND OF THE INVENTION

This invention relates to apparatus for controllably blending a continuous stream of small proportionate amount of a first liquid more acidic than natural ground water with a continuous stream of a pumped natural ground water carrier liquid in such a manner that when the pH, the measure of acidity or alkalinity, of the natural ground water is higher than what is desired for the proper agronomic requirements of the crop being irrigated then the blending rate of the first acidic liquid into the natural ground water carrier liquid can be precisely controlled so as to deliver the proper pH value of water to the irrigation system.

More particularly, the present invention relates to a golf course irrigation system using one or more pumps drawing water from a reservoir or well and pumping it through fixed and buried underground pipe lines to pop-up sprinkler heads or irrigation outlets. More particularly, the present invention relates to apparatus for controllably blending a relatively minute continuous stream of sulphuric acid of very low pH into a relatively large volume flowing water stream of a much greater pH; the pH value of 7 considered to be neutral pH water and said value of 7 pH water to be generally acceptable to the irrigation requirements of most turf grasses cultivated on golf courses.

Natural ground waters are almost always of a pH value higher than 7, the neutral point of alkalinity versus acidity. In areas of the West and Southwestern United States, the natural ground waters can be as alkaline as 8.4 pH; and, in these areas it is necessary to set up water treating systems to lower the water pH before it can be used because no turf grass does well in high pH water. A pH water value of 7 is neither acidic nor is it alkaline. In the professional practice of turf grass agronomy it is necessary that consideration be given to adjustments in soil reaction, or pH.

The preferred pH range for optimum turfgrass growth and vigor is 5.5 to 6.5 for the bentgrasses and fine-leafed fescues; 6.0 to 7.0 for bermudagrass. Kentucky bluegrass, and zoysiagrass; and 6.2 to 7.2 for annual bluegrass. It is therefore necessary that the pH of the irrigation water used to irrigate these grasses be taken into consideration for the health of the grass as well as the amendment of the soil pH. The pH value of the natural ground waters used for irrigation purposes is almost always higher than the neutral pH point of 7; that is, more alkaline, than is required for proper turf grass management.

In golf course irrigation systems, the requirement for turf irrigation water is typically supplied by a multiple pump station consisting of one or more synchronous speed electric motors driving turbine or centrifugal pumps and pumping through an automatic pressure reducing and pressure sustaining control valve such as those manufactured and supplied by CLA-VAL Co. of Newport Beach, Calif. This particular type of valve automatically performs two important functions. The first function maintains a constant downstream pressure regardless of fluctuating demand. The second function sustains the upstream pressure to a pre-determined minimum. Typically, the automatic control valve is a single seated, hydraulically-operated, pilot-controlled, diaphragm type globe valve.

The control system of the CLA-VAL{ TM } consists of a reducing control sensitive to down-stream pressure changes, and pressure sustaining control that is sensed to the main valve inlet. The reducing control responds to slight downstream variations in pressure and immediately controls the main valve to maintain the desired downstream pressure. The pressure sustaining control is normally held open by the upstream pressure, but closes if this pressure drops to the control set point. This in turn closes the main valve to sustain the desired upstream pressure. The pressure sustaining and pressure reducing valve, hereinafter called CLA-VAL{ TM } is adjustable to provide a constant downstream flowing line pressure regardless of the pumped inlet volume and pressure. A typical installation may provide a flowing line pressure immediately downstream of the CLA-VAL{ TM } of 150 psi with the flowing line pressure immediately upstream of the CLA-VAL{ TM } of 200 psi.

The various areas of the golf course to be irrigated typically may consist of separate irrigation zones such as fairways, tees, greens, and green banks which are irrigated separately from the rest of the course in a given irrigation cycle. The fairways consist of much larger areas of grass as compared to the tees or greens; therefore, it is necessary that a greater water volume be pumped to adequately irrigate these larger areas in a given time period. The CLA-VAL{ TM } is used to provide a more or less constant operating pressure to the various sprinkler heads, and this pressure must be maintained at substantially that operating pressure recommended by the sprinkler manufacturer. These CLA-VALS{ TM } have been used in this application for many years and their use and application is well known.

SOIL REACTION (pH) ADJUSTMENTS

Major adjustments in soil pH, sometimes called soil reaction, are best made prior to the establishment of turf grasses. The same is true in any agriculture, and it is best to take a representative number of soil samples and test for pH before making any amendments to the soil condition.

Adjustments in soil pH are most likely to be needed (a) on intensely irrigated, highly leached, coarse-textured soils, (b) where the parent soil material is high in acid, and (c) where the irrigation water possesses a substantial alkaline effect.

Agricultural sulfur is used for lowering the pH, while agricultural limestone is the material most commonly used for raising the pH. Dolomitic limestone may be used where a magnesium deficiency exists. The continued use of an acidifying fertilizer such as ammonium sulfate has been found to be somewhat effective in lowering the pH of alkaline soils.

Major pH adjustments are best accomplished prior to planting so that materials such as agricultural limestone and sulfur can be incorporated into the upper 4 to 6 inches of the plant root zone by the use of mechanical spreaders and plowing the material into the soil. Calcium carbonate in the form of agricultural limestone is usually utilized in acid soils. The finer grades are preferred, as the soil pH correction response is faster. Dolomitic limestone is utilized on soils with magnesium deficiency. Sulfur is commonly incorporated into excessively alkaline soils.

The application rate should be based on soil test recommendations and may vary from one area to another across the golf course, or agriculture project. For this type of practice of soil amendment, it is imperative that these adjustments in soil reaction (pH) be made well in advance of the planting date.

If pre-planting soil pH amendment procedures cannot be implemented; that is, if the golf course is already planted and the soil pH is already too high or too low, then the only procedure available to amend the soil pH is the treating of it with a corrected pH irrigation water. In the case of a pre-planting corrective project where the turf grass manager does not wish to plow the soil and use calcium carbonates or sulfur, it might be preferable and less expensive to amend the soil pH through the use of corrected pH irrigation water.

EFFECTIVE TURFGRASS MANAGEMENT

Effective turfgrass management is dependent on the pH qualities of the irrigation water, irrigation coverage, basic soil pH, drainage, and fertility. It has been a common practice to amend the soil profile, or pH, on an as-needed basis to maintain optimum soil pH levels and soil permeability. This has traditionally been done by employing a soils testing laboratory organization to take soil samples at regular intervals throughout the year.

In the case of an existing turfgrass area as in golf courses, the practice of plowing corrective materials into the root zone of the turfgrass is prohibited because the golf course is in use. Therefore, the turfgrass manager has historically resorted to corrective measures such as dumping sulfuric acid into the water supply to lower the irrigation water pH prior to pumping the irrigation water onto the turfgrass areas. This has been done by dumping sulfuric acid into the lake water supply, or dumping it into the wetwell of the irrigation pumping station.

These practices have proven to be expensive and, to a large extent, ineffective. There has not heretofore existed a system to evenly distribute chemical pH control additives into the irrigation water so that they are evenly mixed and distributed thoroughout, so as not to damage irrigation equipment or the turfgrass plantings.

If a high soil pH is amended by the foregoing conventional means, for example, to a desired level of 6.5; then irrigation is resumed with an alkaline water of 8 pH, it is obvious that the soil pH will not remain at 6.5. Rather, it will rise toward the 8 pH irrigation water condition. As a result of this situation, an ongoing soil amendment process will be necessary in order to maintain the soil pH at the desired level of 6.5.

Other important factors to be considered in the control of soil and water pH are the scaling tendencies of aqueous solutions of calcium carbonate and iron contained in the irrigation water. Calcium carbonate and iron solubilities both decrease with increasing pH value; therefore, it is more difficult to hold iron in solution and to keep calcium scale from forming when the irrigation water pH rises above 7. It follows then, to prevent scaling of irrigation control valves and sprinkler heads, it is incumbent upon the turf grass manager to maintain both soil and water pH values of 7 or less.

In the irrigation of a typical golf course in the Western United States, it is not unusual for the irrigation water use to be in the order of one hundred twenty million gallons annually. If the pH value of the irrigation water is 7.6 and the desired value is 6.5 pH, then approximately 26 gallons of 66 Baume Sulfuric Acid must be added to each million gallons of the water to reduce the pH to the desired value of 6.5. Typically, these golf courses are irrigated each month in the year at a fairly constant water usage; therefore, the monthly use of irrigation water could be as much as ten million gallons per month. In this case, the sulfuric acid use per month would approach 260 gallons. It is considered provident to provide a sulfuric acid storage tank at the golf course pump station of 300 gallons capacity, minimum, in order to minimize handling problems.

A further phenomenon has been noted in certain areas of the United States wherein the ground waters used for irrigation may be extremely alkaline from the presence of heavy concentrations of calcium carbonates; that is, the pH value of the irrigation water may be as high as 8.4 pH. In these cases, it is extremely difficult to maintain the calcium carbonates in solution; particularly at the suction pressures of conventional turbine type irrigation pumps. As a result, a phenomenon know as "effervescing waters" occurs, which is the release of carbon dioxide and peripheral gases from the water. This presents the appearance of bubbling champagne, and the release of gas is copious, even at atmospheric pressure.

The "effervescing waters" condition renders extremely difficult the problem of mixing any additives such as sulfuric acid into a relatively small flow rate stream of this effervescing water and then attempting to pump this solution into the main stream of irrigation water. In addition to the normal effervescence of the highly alkaline irrigation water, the introduction of 66 Baume sulfuric acid causes even greater release of carbon dioxide and carbon trioxide gases. This is one of the problems that is solved by this present invention, and that is the elimination of the cavitation problems in the suction of the postive displacement pump used to pump the acidic water solution into the flowing irrigation water main stream.

Known prior art devices include that disclosed in U.S. Pat. No. 4,768,712. Said U.S. Pat. No. 4,768,712 discloses an apparatus for use with the irrigation system of a golf course wherein one or more irrigation pumps are used to pump water from a water supply reservoir or well through pipe lines to irrigation sprinkler heads or devices wherein a precise, "spoon feeding," continuous flow of liquid fertilizer is blended into the pumped irrigation water stream at controllable, pre-set ratios regardless of the number of irrigation pumps running (and resulting varying irrigation flow rates) and providing precise liquid fertilizer to irrigation water ratios in the agronomically pre-determined ratios required for the optimum growth, health, and appearance of the different turf grasses used on the greens, tees, fairway grasses and any other specific areas of turf grasses which may differ from these.

No other prior art is known which provides apparatus allowing the turf grass manager to constantly and automatically monitor the irrigation water pH value being produced at the discharge of the irrigation pumps and, before it continues into the irrigation distribution pipe lines, correct it to the desired irrigation water pH value deemed necessary for the continual correction of soil pH and the necessary water pH value for consistent good management of the types of turf grasses being used on his golf course.

Thus, a need exists for an effective, non-labor intensive, uncomplicated apparatus which enables the turf grass manager to pre-determine and automatically provide the irrigation water pH which is needed to (1) amend the soil pH in various areas of the golf course as needed; whether as a pre-planting soil pH amendment or as an in-soil pH amendment treatment with existing turf grass; and (2) correct the irrigation water pH to the desired value between the discharge of the irrigation pumps and its entrance into the irrigation water pipe line distribution system extending from the pump station so as to irrigate the various areas of the golf course with the desired pH value of irrigation water.

SUMMARY OF THE INVENTION

The present invention provides apparatus for use with the irrigation system of a golf course, or other agriculture, wherein one or more irrigation pumps are used to pump water from a water supply reservoir or well through pipe lines to irrigation sprinkler heads or water distribution devices wherein a means is provided to continuously monitor the irrigation water pH value at a point downstream the irrigation pump discharge manifold of the pump station; wherein a means is provided to supply a precisely measured quantity of sulfuric acid from a relatively large storage reservoir and introduce this measured quantity into a relatively small irrigation water flow, thence into the suction of a relatively high discharge capacity positive displacement plunger pump, thence to be pumped into the discharge manifold of the irrigation pump station, at a point between the irrigation pump discharge into the discharge manifold and the downstream pH monitoring point.

This apparatus thus provides a monitoring loop which allows a certain retention time of the sulfuric acid solution in the irrigation water before its final discharge into the pipe line distribution system. This monitoring loop being fitted with a variable displacement sulfuric acid pumping system which is programmable in its delivery volumes; thus allowing a close control over the flowing irrigation water pH value.

Also provided in this invention is a strip chart recording system which continuously records the basic irrigation water pH as delivered from the well or reservoir; and a corresponding corrected irrigation water pH as delivered to the field irrigation sprinkler heads or other water distribution means.

DESCRIPTION OF THE DRAWING

The single figure of the drawing, entitled

DESCRIPTION OF THE INVENTION

Figure 1:
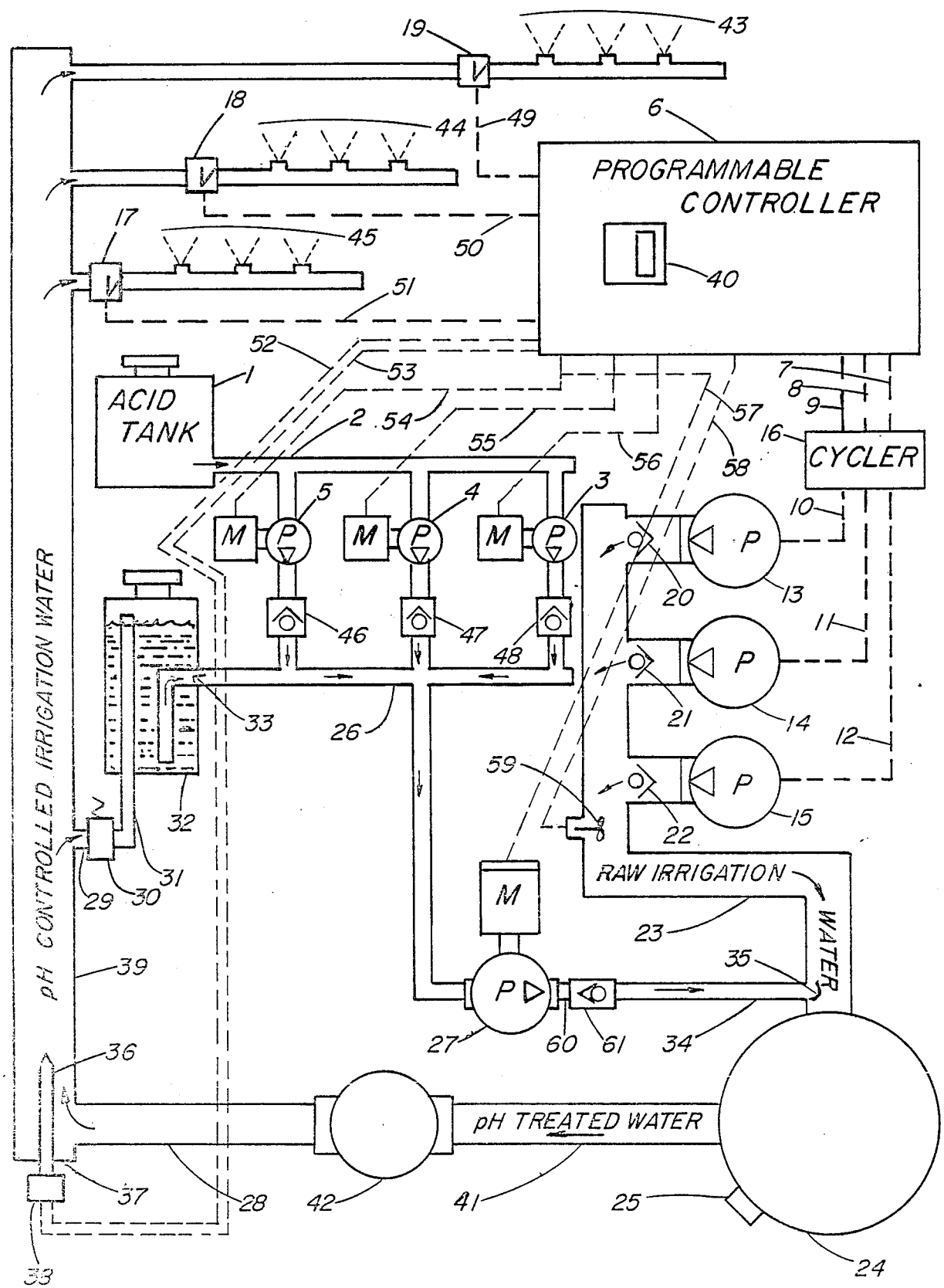
FIG. 1, is a complete flow diagram showing a typical golf course pumping station; one embodiment of its various areas of irrigation; and, one embodiment of the acid tank, sulfuric acid injection pumps, ph monitoring device, acid manifold, high pressure injection pump, and irrigation water sampling line which comprise my invention of an "Automatic Irrigation Water pH Control Apparatus For Continuous Use On Golf Courses."

The present apparatus includes a sealable storage container 1 hereinafter termed "acid tank," adapted for containing at least one months' supply of liquid, 66 Baume Sulfuric Acid for convenience of inventory control by the operator. Disposed in the container is an outlet conduit 2 adapted to supply a gravity supply of Sulfuric Acid on suction demand of the sulfuric acid injection pumps, 3, 4, 5.

The said sulfuric acid injection pumps 3, 4, 5 are each one a variable displacement, positive displacement sulfuric acid pump, electrically driven and controlled by controller 6 through electrical circuits 54, 55, 56. Said controller 6 being adapted to be energized by electrical circuits 7, 8, 9 proceeding from the pump station cycler 16 which contains the electrical starters and cycling controls for each of the electrical drive motors driving the irrigation pumps 13, 14, 15.

These electrical circuits 7, 8, 9 are correspondingly energized by electrical circuits 10, 11, 12; each one of which is related to the particular irrigation pumps 13, 14, 15; a typical golf course being equipped with three, deep well, shaft driven turbine pumps; two of which are typically capable of producing 1350 gallons per minute each at a discharge pressure of 200 psi and one, called the "jockey pump," being capable of producing approximately 600 gallons per minute at a discharge pressure of 200 psi.

The aforementioned irrigation pump station cycler 16 providing the ability of the system to provide electrical driving energy to each of the irrigation pumps and, selectively to each one of the sulfuric acid injection pumps 3, 4, 5 through the controller 6 in such a manner that when irrigation pump 13 is running that sulfuric acid injection pump 3 is energized. Then, when irrigation pump 14 is running, sulfuric acid injection pump 4 is energized. And, when irrigation pump 15 is running, sulfuric acid injection pump 5 is energized.

The aforementioned cycler 16 is also providing programmable electrical controls to energize the various control valves 17, 18, 19 through electrical circuits 51, 50, 49 respectively, which allow the irrigation of several areas of the golf course on a selective basis.

In the irrigation mode, consider that irrigation pumps 13, 14, 15 are all required to operate, thus opening check valves 20, 21, 22 to permit irrigation water pumped by the irrigation pumps 13, 14, 15 to flow into discharge manifold 23, thence into and through gas eliminator tank 24, containing automatic gas release valve 25; said automatic gas release valve 25 being adapted to automatically release gas from the effervescing irrigation waters when the gas volume of the gas eliminator tank 24 reaches a predetermined volume. It being necessary to remove effervescing gas from the flowing irrigation water in order to prevent damage to control valves 17, 18, 19 and irrigation sprinkler heads 45, 44, 43.

The pumped irrigation water then proceeds from gas eliminator tank 24 into flow conduit 41, thence into CLA-VAL{ TM } 42 which is a pressure sustaining and pressure reducing valve used by most golf course pumping stations to maintain the proper pumping pressure to feed the irrigation sprinkler heads 43, 44, 45. Said irrigation sprinkler heads 43, 44, 45 being selectively controlled by cycler 16 through extensions of electrical circuits 7, 8, 9 which are electrically connected to control valves 17, 18, 19 by electrical circuits 49, 50, 51 respectively. Pumped irrigation water proceeds from CLA-VAL{ TM } 42 into irrigation pipe line 28.

The irrigation water flow into the discharge manifold 23 being continuously injected with 66 Baume sulfuric acid obtained from the action of the sulfuric acid injection pumps 13, 14, 15 taking 66 Baume sulfuric acid from the acid tank 1 through extensions of conduit 2 and injecting it into the acid manifold 26 which is being supplied with irrigation water flow at a regulated pressure of approximately 65 psi from the main irrigation pipe line 28 at sample port 29, through a pressure regulating valve 30 being set to produce approximately 65 psi flowing pressure into flow conduit 31 which is adapted to pass through the lower portion of effervescing gas tank 32 and extend upwardly to the upper section of said effervescing gas tank 32 in such a manner as to allow the flowing irrigation water to impinge upon the top closure of said effervescing gas tank 32 and cause increased breakout of Carbon Dioxide Gas from the effervescing irrigation water.

It being necessary to eliminate effervescing gas from the flowing sample water in acid manifold 26 to prevent occurrence of suction cavitation of booster pump 27, which might cause irreversible damage to booster pump 27 and/or failure to pump properly.

It has been found that the effervescing gas tank 32, when the incoming irrigation water flow is regulated at approximately 65 psi, causes a gas cap to form in the top of said effervescing gas tank 32 and prevents further effervescence from occurring. It has also been found that the volume of the effervescing gas tank 32 must be approximately ten times that of the flowing irrigation water flowing through it.

Thus, this system then tends to eliminate all cavitation from occuring in the suction of booster pump 27, which is sized to pump fluid at the rate of approximately 0.2% of the maximum discharge volume of the irrigation pump station when the system is operating normally and at a discharge pressure capacity approximately 50 psi greater than the maximum discharge pressure capacity of the irrigation pumps. It having been found that this rate of flow of the booster pump 27 is the optimum flow rate for maintaining a close and precise control of the delivered irrigation water pH. It being necessary that this discharge pressure capability of the booster pump 27 be in excess of 250 psi in order to allow pumping into the discharge manifold 23, which may be under pressures from 165 psi up to near 250 psi.

The aforementioned effervescing gas tank 32 being adapted with a flow conduit 33 connected into acid manifold 26 so as to feed approximately 6 gallons per minute flow rate of 65 psi irrigation water, having been injected continuously with a relatively small flow of 66 Baume sulfuric acid, thence into the suction of the booster pump 27; the discharge of booster pump 27 adapted with a discharge flow conduit 60, this being connected to check valve 61, thence into the injector line 34, thence being introduced into the raw irrigation water flowing in discharge maniflold 23 by means of injector quill 35.

Control of the amount of 66 Baume sulfuric acid being injected by the sulfuric acid injection pumps 3, 4, 5 into the acid manifold 26 is effected by the ph sensing probe 36 positioned at sensing connection 37 located in main irrigation pipe line 28. Said pH sensing probe 36 being electrical in nature, it is fitted with transducer 38, which produces a feed-back electrical signal to controller 6; said controller 6 being of a solid state programmable nature, it then regulates the displacement of the acid injection pumps 3, 4, 5 in order to maintain a preselected pH value of the flowing, treated, irrigation water in the downstream pipe line 39.

A safety control measure affecting the sulfuric acid being injected by the sulfuric acid injection pumps 3, 4, 5 in the acid manifold 26 is effected by a manually pre-set electrical control internal to the controller 6; this control to include three set points which will provide the operator with a safety range of pH control; and, the mean set point being the desired pH, for example, 7 pH; and, the high set point being set, for example, at 7.2 pH; and, the low set point being set, for example, at 6.8 pH; the high set point value serving as a high alarm function so that when the pH of the treated water exceeds the desired high set point, said controller 6 will cease injection of acid; and, the low set point value will serve as a low alarm function so that when the pH of the treated water drops below the desired low set point, said controller 6 will cease the injection of acid; said controller 6 receiving electrical signals from pH sensing probe 36 as heretofore explained.

More specifically, this safety control measure is set by the operator after the irrigation system is operating; and, with no acid injection being carried out, the maximum water pH is determined from observation of the strip chart recorder 40. Then, the operator starts the acid injection by adjusting the high set point pH value higher than the actual maximum pH value of the untreated flowing irrigation water. Once the system is stabilized and functioning, the operator then adjusts the high set point of the treated irrigation water to a value equal to that of the untreated irrigation water pH. Then, if a line break occurs in the sulfuric acid injection system, allowing raw sulfuric acid to flood the irrigation pump station facility with subsequent damage to such facility; no sulfuric acid then being injected into the flowing irrigation water; the controller 6 would immediately sense the high set point pH of the irrigation water by means of the pH sensing probe 36 and shut down the sulfuric acid injection pumps 3, 4, 5.

As a further safety feature, a fluid velocity measuring device 59 is located in discharge manifold 23 and electrically connected to controller 6 by means of electrical circuit 58. If a break occurs downstream in pipe line 39, the fluid velocity in discharge manifold 23 will increase drastically. This increase in velocity is sensed by the fluid velocity measuring device 59 and the controller 6 disconnects all of the sulfuric acid injection pumps 3, 4, 5 so as not to waste the treating acid. Furthermore, if the irrigation pumps 13, 14, or 15 fail to deliver irrigation water to the discharge manifold 23, even though their respective electrical drive motors are running the fluid velocity measuring device 59 immediately registers a zero fluid velocity and the controller 6 disconnects the sulfuric acid injection pumps 3, 4, 5. This feature prevents dumping raw acid into the discharge manifold 23, thus causing corrosion damage to all downstream components of the irrigation system.

In order to maintain a continuous record of the quality of the flowing, treated, irrigation water the controller 6 is adapted with an electrically driven strip-chart recorder 40 of a size capable of containing a continuous record for a full month of operation of the system.

The electrical control techniques described in this invention are well known in the industry and are not a part of this invention, but are used as a commercially available state of the art technique; thus, the complete wiring diagrams for this system are not made of part of this disclosure.

It is obvious to one skilled in the art that if it is desired to increase the pH of the irrigation water rather than decrease it as is usually the case; then, instead of using sulfuric acid or acetic acid as the water pH treating media, an alkaline solution such as an inorganic alcohol of the monovalent hydroxyl group could be used. In such a case, the "acid injection pumps" would then become "alcohol injection pumps," and all the other equipment labeled "acid" would then be labeled "alcohol."

We claim:

1. Apparatus for continuously blending a first liquid sulfuric acid or acetic acid of pH less than that of a second liquid of natural ground water at a variable flow rate of first liquid with a variable flow rate of second liquid wherein the desired objective is to reduce the pH of the flowing irrigation water to a predetermined value wherein apparatus is used on golf courses where irrigation water is pumped from wells or reservoirs by turbine or centrifugal pumps and thence through a pressure reducing and pressure sustaining valve such as the CLA-VAL{ TM } positioned in the discharge line of an irrigation pump station having plural irrigation pumps feeding a discharge manifold with each irrigation pump having a drive system, as part of the operation of the golf course irrigation system wherein irrigation water of pre-determined pH value is required on various turfgrass areas of the golf course to agronomically promote health and appearance of the turfgrass, comprising;

an acid inventory tank of storage capacity sufficient to equal that amount of acid normally used in a generally accepted work cycle time period for convenient inventory management to the golf course operator;

a plurality of electrically variable delivery positive displacement acid pumps having driving means with a maximum discharge pressure capability of 70 psi, connected to take suction from said acid inventory tank and discharging into an acid manifold;

an acid manifold comprising an irrigation water sampling line; pressure regulating valve; positive displacement booster pump; and an effervescing gas tank; said acid manifold being connected to receive a sample of flowing irrigation water from a sample port located immediately downstream the CLA-VAL{ TM } and further connected to discharge through an injector quill into the irrigation pump station discharge manifold at a point immediately downstream the irrigation pumps and upstream the CLA-VAL{ TM };

a fluid velocity indicator positioned in the irrigation pump station discharge manifold at a point upstream the discharge point of the acid manifold, and connected to provide an electrical signal of fluid velocity to a programmable, solid-state electrical controller;

said programmable, solid-state electrical controller connected to receive electrical circuit signals from each irrigation pump drive system and then to transmit electrical power to the driving means of each of the acid injection pumps respectively; and, to receive electrical signals from the fluid velocity indicator positioned in the irrigation pump station discharge manifold; and, said controller to include three set points which will provide the operator with a safety range of pH control; and, the mean set point being the desired pH, for example, 7 pH; and, the high set point being set, for example, at 7.2 pH; and, the low set point being set, for example, at 6.8 pH; the high set point value serving as a high alarm function so that when the pH of the treated water exceeds the desired high set point, said controller will cease injection of acid; and, the low set point value will serve as a low alarm function so that when the pH of the treated water drops below the desired low set point, said controller will cease the injection of acid; said controller connected to receive electrical signals from a pH sensing probe;

said pH sensing probe of electrical nature positioned in the irrigation pump station pipe line at a point downstream the point at which the acid manifold is connected to take a continuous sample of the flowing irrigation water.

2. The apparatus according to claim 1 wherein each said variable delivery positive displacement acid pump is provided with an in-line downstream check valve adapted to allow fluid flow to proceed downstream the sulfuric acid injector pump but to prevent fluid flow in the reverse direction and back to the pump from the acid manifold.

3. The apparatus according to claim 1 wherein said positive displacement booster pump is fitted on its discharge side with an in-line check valve adapted to permit flow downstream but to block flow in the reverse direction.

4. The apparatus according to claim 1 wherein said injector quill can be positioned so as to discharge the mixture of acid and the sample of irrigation water precisely into the geometric center of the flow passage of the irrigation pump station discharge manifold.

5. The apparatus according to claim 1 wherein said fluid velocity measuring device is adapted to transmit either of two electrical signals; one, that of positive fluid velocity and; two, that of zero fluid velocity.

6. The apparatus according to claim 1 wherein said acid manifold is provided with a pressure regulating valve adapted to be set so as to maintain the flowing pressure of the sampled irrigation water flowing into the effervescing gas tank and thence downstream in the sample line to a maximum of approximately 65 psi.

7. The apparatus according to claim 1 wherein said effervescing gas tank pressure vessel is of a volume at least ten times that of the pumping rate of the booster pump located in the acid manifold, and rated operating pressure of the pressure vessel is limited to 75 psi.

8. The apparatus according to claim 1 wherein said booster pump is a positive displacement pump adapted to pump fluid at a rate of 0.2% of the maximum discharge volume capacity of the irrigation pump station with all pumps operating and irrigation system operating normally; with a rated discharge operating pressure equal to a value at least 50 psi greater than the maximum discharge pressure of the irrigation pumps.

9. The apparatus according to claim 1 wherein said pH sensing probe is located at a point in the irrigation pipe line immediately downstream the discharge side of the CLA-VAL{ TM }, and immediately downstream the outlet sample port feeding a sample of irrigation water to the acid manifold; said pH sensing probe being electrical in nature and adapted with a transducer to transmit continuous electrical signals to the programmable solid-state controller whereby the pH of the flowing water may be continuously monitored and evaluated by the programmable solid-state controller.

10. The apparatus according to claim 1 wherein said controller is of a solid-state, electrical and electronic nature; programmable as to the operation of the acid injector pumps, depending on whether or not fluid velocity exists in the discharge manifold of the irrigation pump station; programmable as to the selection of which of the acid injector pumps shall be operated, consistent with the particular irrigation pumps that may be operating; programmable as to the pre-set, desired pH of the delivered irrigation water, whereby the variable delivery rate of each of the acid injector pumps is automatically and continuously adjusted electrically so as to increase or decrease the flow of acid into the acid manifold so as to maintain the desired delivery pH water value.

11. The apparatus according to claim 1 or claim 10 wherein said controller is equipped with a continuous strip-chart recorder, electrically driven and adapted to provide a continuous record of the delivered pH value of the irrigation water delivered downstream the location of the pH sensing probe.

* * * * *